Jan. 8, 1946.   M. CASTRICUM   2,392,577
TIRE TREAD COVER
Filed Oct. 23, 1942   2 Sheets-Sheet 1

Asphalt Treated

INVENTOR.
MARTIN CASTRICUM
BY Lester J. Bradlong
ATTORNEY

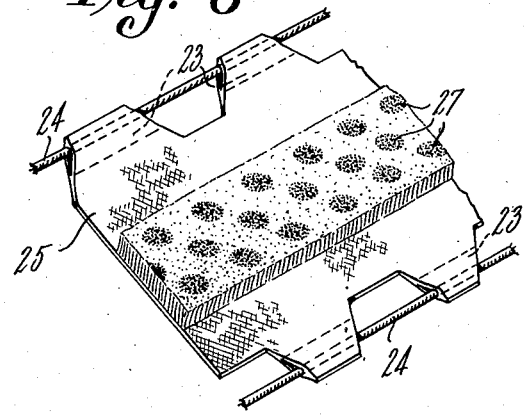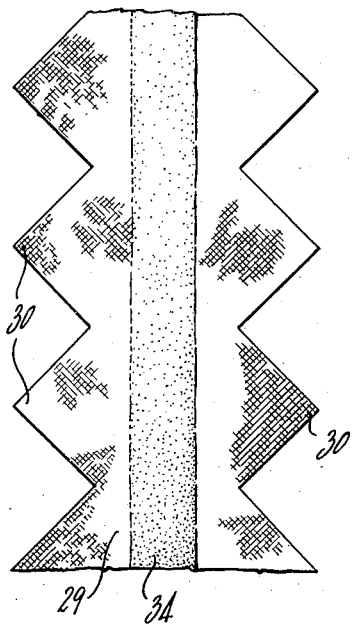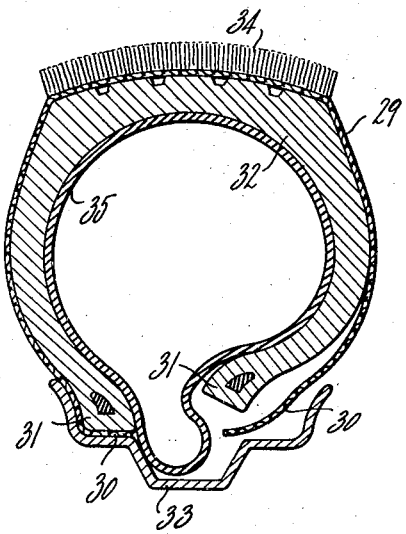

Patented Jan. 8, 1946

2,392,577

UNITED STATES PATENT OFFICE 2,392,577

TIRE TREAD COVER

Martin Castricum, Grosse Pointe, Mich., assignor to United States Rubber Company, New York, N. Y., a corporation of New Jersey Application October 23, 1942, Serial No. 463,104

2 Claims. (Cl. 152—177)

This invention relates to covers for tire treads and in particular it relates to an auxiliary attachment to pneumatic tires for the purpose of protecting the tire tread from wear to thereby increase the life of the pneumatic tire.

Due to requirements for the conservation of rubber, the use of some means for projecting the tread of tires from wear is becoming imperative. I have found that a textile cover for tires, preferably formed of cotton, when suitably constructed and treated, may be placed about a tire over its tread with the result that substantially all of the wearing action will be limited to the cover. Such a tire cover is particularly adaptable for use upon worn tires to enable the operator to obtain increased mileage.

In particular, my invention relates to a tire cover comprising a fabric base layer of strong woven fabric, the warp and weft of which when the fabric is on the tire, lie at an angle of approximately 45° relative to the circumferentially extending fabric, a close-set cotton pile construction associated with and extending over the tread portion of the base fabric, and means for securing the base fabric to a pneumatic tire.

Among the objects of my invention are to provide a tire cover which is wear-resistant; which may be readily attached to a pneumatic tire; which will closely conform with the transverse and circumferential contour of the tire; which will resist skidding; and, which may be manufactured efficiently and economically. These and objects and advantages will appear more fully in the following detailed description when considered in connection with the accompanying drawings in which:

Fig. 6 is a perspective view of a portion of one of the tire covers substantially as shown in Fig. 5;

Fig. 7 is a plan view of part of an individual tire cover such as may be cut from the fabric of Fig. 1; and Fig. 8 is a transverse sectional view of a modified construction showing a tire and rim wherein the tire is provided with the cover of Fig. 7.

Figure 1:
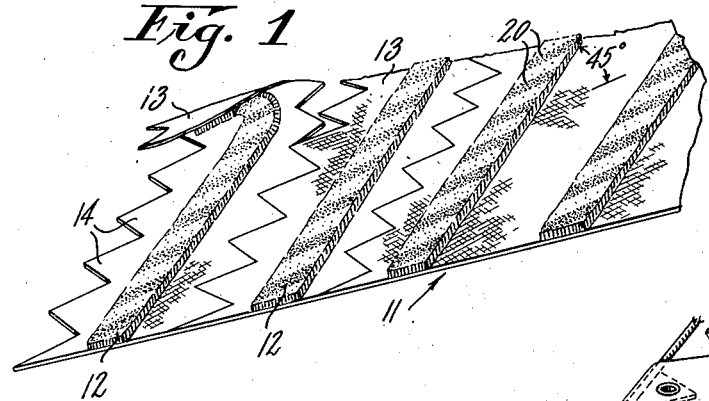
Fig. 1 is a perspective view of a portion of a woven length of fabric from which individual tire covers may be cut.

Referring to the drawings and in particular to Fig. 1, I show one form of the invention in which strips to form tire covers are cut from a length of prepared material. The base fabric 11 comprises a woven fabric formed of warp and weft threads which are firmly interwoven to form a strong durable strip of fabric. While the warp and weft threads may be formed of various textile materials, it is preferable to employ cotton for this purpose. Associated with a portion of the base fabric 11 is a dense pile 12 of cut or uncut threads or yarn. This pile portion is intended to form the wear-resisting tread portion of the tire cover. For this reason, it is desirable to make the pile as thick and dense as possible and it may be firmly interwoven with the base fabric 11 by employing any one of a number of well known weaves. Preferably this pile is formed of cotton yarn or thread. Good results have been obtained by providing a pile having a length of from ¼ inch to ¾ inch but approximately ½ inch is considered preferable.

Since the base fabric 11 is intended to be cut on the bias into strips which will extend circumferentially around a tire, it is desirable that the warp and weft threads of the fabric extend diagonally relative to the circumferential length of the strip of fabric as it is associated with a tire. To obtain this condition, it is necessary to weave the pile 12 so as to form a strip about 5 inches in width and extending diagonally relative to the warp or length of the base fabric 11. Preferably the angle formed between the strip of pile 12 and the warp threads of the fabric 11 is approximately 45°. As thus shown Fig. 1 a strip of fabric 11 of any desired length may be woven, and at the same time diagonal strips of pile may be formed thereon at properly spaced intervals. From such a length of material, individual strips 13 may be cut to form tire covers, each strip being of sufficient length to extend circumferentially around a tire. When cutting the strips 13 to form tire covers from the length of fabric 11, it is desirable to form the cut in such a manner as to provide serrated edges along the margins of the fabric. The pitch of the serrations are relatively large so as to form approximately six to ten projecting portions 14 along each edge of the tire cover. The purpose of providing these marginal serrations will now be described.

After the strips 13 are cut from the length of fabric 11, the ends of the strip may be trimmed as necessary to accommodate the circumferential length of the tire around which the strip may be placed. The projecting portions 14 forming the serrations are turned underneath the base fabric 11 so that the apex of each projecting portion is substantially in alignment with the base line forming the serrations, and they are held in this turned under position by grommets 15 that secure the projecting portions 14 to the base fabric 11. It is to be understood, however, that other means of attachment may be employed as for example the projecting portions 14 may be stitched against the base fabric to form in effect a hem along the margins of the fabric.

Figure 3:
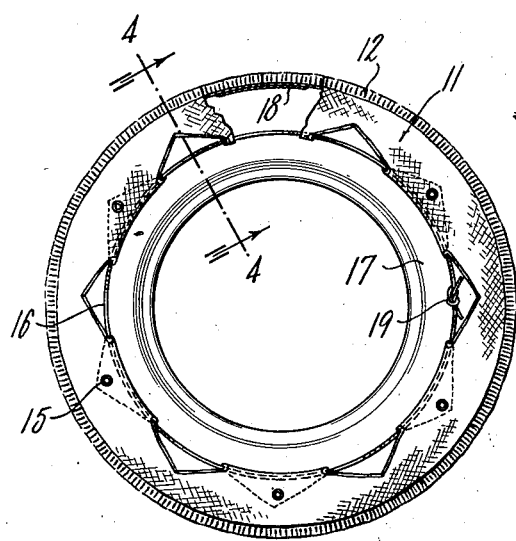
Fig. 3 is a side elevational view of a tire cover assembled with a pneumatic tire.

Through the loops thus formed by the turned under projections 14 is threaded a cord or rope 16. An assembly as thus provided is now ready to be mounted on a tire 17 as shown in Fig. 3. In mounting the cover on the tire, it is preferable that the ends of the cover be butt spliced in order to prevent any substantial irregularity along the circumference of the tire. As shown in Fig. 3, a short strip 18 of woven fabric is positioned at this region at the underside of the ends of the fabric 11. To secure a union between the ends of the tire cover 13, the fabric 11 may be sewed to the underlying strip of fabric 18 or the layers may be cemented together or they may be both cemented and sewed. To secure the tire cover 13 onto the tire 17 after the ends of the cover have been connected, it is merely necessary to align the cover with the tire and tighten the cord 16 on either side of the tire and retain the cord in tight position by a knot 19.

Figure 4:
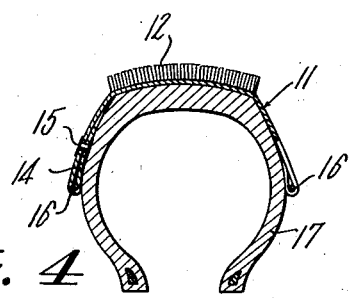
Fig. 4 is an enlarged transverse view in section of a pneumatic tire and cover taken on line 4—4 of Fig. 3.

Due to the curvature of the tire both circumferentially and cross-sectionally as shown in Figs. 3 and 4, it is very desirable that the fabric be arranged to fit these contours snugly. This is accomplished by forming the cover of a bias fabric in which the warp and weft threads extend diagonally relative to the circumferentially extending pile wear surface 12. Also the serrations which form the projecting portions 14 prevent any buckling of the fabric along the sidewalls of the tire. This bias construction improves the appearance and fit of the tire cover, provides a more uniform distribution of the retaining loops 14 and consequently insures better retention of the cover upon the tire. However, if desirable an adhesive may be applied between the underside of the tire cover and the tread portion of the tire to help hold the cover in place. In such case the tread surface of the tire 17 is cleaned and a conventional adhesive as, for example, rubber cement, or a synthetic rubber or resin cement, is applied either to the tread surface of the tire, to the under surface of the fabric of the tire cover or to both.

Figure 2:
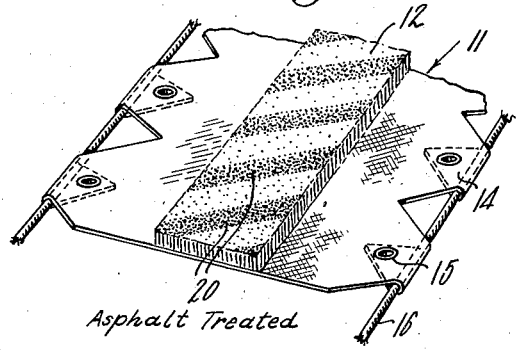
Fig. 2 is a perspective view of a portion of a completed tire cover.

Since the tire cover is exposed to various weather conditions, it is desirable to treat the cotton of which the cover is formed or the woven fabric to make the cover water-repellent and to prevent mildew. I have also found that by localized treatment of the pile forming the tread portion of the tire cover, that an increase in skid resistance is obtained. An example of the location of such treatment is illustrated in Figs. 1 and 2 by the shaded areas 20. The thread or yarn may be treated prior to its formation into the pile 12. In such case, a pattern of various configurations may be formed directly during the weaving of the pile 12 by introducing the treated threads in a predetermined order. To provide this skid resisting condition the cotton yarn or thread may be treated by the application of a conventional asphalt emulsion or by the application of other well known water-repellent agents or preservatives.

As a result of this treatment localized portions of the pile forming the tread possess different physical characteristics. For example, the treated portion becomes stiffer and it is due to these physical differences that increased traction is secured and the anti-skid quality is improved. Such improvements are of particular importance when the tire cover is being operated on wet roads. While the treatment of the pile-forming cotton may be carried on prior to the processing of the pile, it is to be understood that the pile may be treated after its completion by applying the asphalt or the like to localized areas of the pile area.

Figure 5:
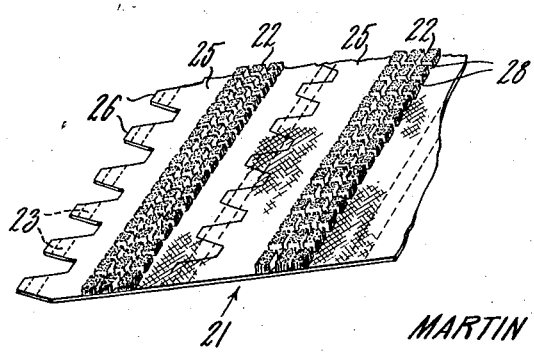
Fig. 5 is a perspective view of a length of fabric from which tire covers may be cut and illustrating a modification of the invention.

A modified construction for receiving the cover anchoring cords or ropes is illustrated in Figs. 5 and 6 wherein there is shown the base fabric 21 having the rows of textile pile 22, the fabric 21 and pile 22 may be identical to the fabric 11 and pile 12, respectively, previously described. At a point located midway between the strips of pile 22 and in the fabric 21 is formed a split weave providing an opening 23 parallel to the length of the strip of pile. The purpose of this to provide a hem-like opening through which a cord 24 may be passed as shown in Fig. 6. The individual strips of fabric 25 which are cut from a length of fabric 21 are severed in a manner to provide a serrated edge forming a plurality of projecting portions 26. These projecting portions form a truncated pattern in which the openings 23 produce in effect sleeves for the passage of the cord 24. The advantage of such a construction is that with the exception of the cord 24 and the cutting operation, the entire unit is formed during the weaving process.

The pattern 27 as shown by the shaded areas in the tread portion of the pile in Fig. 6 illustrates one method of application of localized treatment of the pile in order to increase its skid resistance. This treatment may be accomplished in the same manner as above described in connection with the areas 20. Another method of improving the skid resistance of the pile tread is to provide the spaces 28 (Fig. 5) while forming the pile on the base fabric. Thus in effect providing a grooved non-skid pattern or configuration in the pile tread.

In the embodiments of the invention shown in Figs. 1 to 6 inclusive, tie cords or tie ropes are associated with the projecting side portions such as 14 for securing the tire cover in place upon the tire. The cover, however, may be firmly secured in place by employing the modified construction which is shown herein in Figs. 7 and 8 and will now be described.

There is shown in Fig. 7 a portion of a tire cover 29 which may be identical with any one of the cover strips 13 of Fig. 1 except that the projecting portions 30 of Fig. 7 should be longer than the portions 14 so that they will form flaps adapted to be gripped between the bead portions 31 of the tire 32 and the side flanges of the rim 33 as shown in Fig. 8. The cover 29 has a pile wear surface 34 such as shown in Fig. 1 that extends diagonally of the warp and weft threads.

After the flaps 30 have been manually inserted between the bead portions 31 and side flanges of the rim 33 the inner tube 35 may be inflated. This will force the bead portions firmly against the side flanges of the rim 33 to clamp the flaps therebetween and thereby firmly hold the cover 29 in place upon the tire 32.

Numerous tests have been conducted in order to determine the merit of a construction as herein described and it has been demonstrated that such a tire cover has a useful life equivalent upwards of 2400 miles. The tire cover, therefore, as a replaceable unit may be associated with conventionally used pneumatic tires so as to prolong the life of the tires indefinitely or until the tire fails due to some other reason besides tread wear.

As thus described, it is believed apparent that I have provided a novel tire cover in which the construction features described enables the cover to be easily and semi-permanently associated with a tire, and which construction features are so arranged as to permit its practical and economical manufacture, and while I have described preferred embodiments of my invention, it is to be understood that it is susceptible of those modifications which appear within the spirit of the invention and as defined in the scope of the appended claims.

Having thus described my invention, what I claim and desire to protect by Letters Patent is:

1. A textile cover for protecting tire treads from wear comprising a woven base fabric cut on the bias to extend around the circumference of a tire and having a dense strip of pile woven diagonally of the threads of the base fabric to form a thick wear surface over the tread of the tire, means for removably securing the cover upon the tire, and said pile strip having areas of the pile treated with a stiffening plastic and untreated pile areas lying between the treated areas.

2. A textile cover for protecting tire treads from wear comprising a woven base fabric adapted to extend around the circumference of a tire and having a dense pile strip forming a wear surface over the tread of the tire, means for removably securing the cover upon the tire, and said pile strip having areas of the pile treated with a stiffening plastic and untreated pile areas lying between the treated areas.

MARTIN CASTRICUM.